3,433,792
ALKYLPYRIDINE PRODUCTION
Charles R. Adams, Ippendorf, Jurgen F. Falbe, Bonn, and Friedrich W. A. G. K. Korte, Hangelar, Germany, assignors to Shell Oil Company, New York, N.Y., a corporation of Delaware
No Drawing. Filed July 19, 1965, Ser. No. 473,221
Claims priority, application Germany, Oct. 6, 1964, S 93,642; May 10, 1965, S 97,026
U.S. Cl. 260—290
Int. Cl. C07d 31/20, 31/08
11 Claims

ABSTRACT OF THE DISCLOSURE

Alkylpyridines are prepared by the vapor-phase reaction of hydrocarbon aldehydes and ammonia in the presence of a cobalt or nickel aluminum phosphate as catalyst.

---

This invention relates to an improved process for the production of alkylpyridines.

Methods are available in the art for the production of alkyl-substituted pyridines by reaction of aldehydes with ammonia in the presence of metal-containing catalysts. For example, Klingsberg, "Pyridine and Its Derivatives," Interscience, New York, 1960, pp. 460–500, reports the formation of low yields of 2-ethyl-3,5-dimethylpyridine by reaction of propionaldehyde and ammonia over metal phosphate catalysts such as boron phosphate, aluminum phosphate and cadmium phosphate. German Patent No. 1,058,058 issued April 27, 1959, to Badische discloses reaction of acetaldehyde with ammonia over acid phosphates of metals of Groups I and II of the Periodic Table to produce alkylpyridine product. However, such acid phosphate catalysts are not suitably employed with aldehydes of higher molecular weight. It would be of advantage to provide an improved process for the production of alkylpyridines by reaction of aldehydes with ammonia.

It is an object of the present invention to provide an improved process for the production of alkyl-substituted pyridines by reaction of certain aldehydes with ammonia. More particularly, it is an object to provide an improved process for the production of alkylpyridines by reaction of certain aliphatic aldehydes with ammonia in the presence of catalysts comprising oxygen chemically combined with aluminum, phosphorus, and a Group VIII metal third component.

It has now been found that these objects are accomplished by the process of contacting certain acyclic, saturated, hydrocarbon aldehydes of from 3 to 12 carbon atoms, with ammonia, in the vapor phase, in the presence of an oxide catalyst wherein oxygen is chemically combined with aluminum, phosphorus and Group VIII metal component selected from nickel and cobalt. The process of the invention wherein the at least three component oxide catalysts are employed provides comparatively higher yields of a pyridine product than do known processes of the art wherein two-component oxide or acid oxide catalysts are utilized.

The aldehyde reactants are acyclic, saturated, hydrocarbon monoaldehydes of only atoms of carbon, hydrogen and oxygen besides the oxygen portion of the single carbonyl moiety located upon a terminal carbon atom of the aldehyde reactant, and are aldehydes of from 3 to 12 carbon atoms wherein the carbon atom alpha to the carbonyl moiety, i.e., adjacent to the

moiety, has two hydrogen substituents. The aldehyde is further characterized as an acyclic alkanal and is represented by the empirical formula:

wherein $n$ is a whole number from 3 to 12 inclusive and two of the indicated hydrogens are located as substituents on the carbon atom alpha to the carbonyl group. Such aldehydes are illustrated by propionaldehyde, n-butyraldehyde, n-hexanal, 4-methylpentanal, 3-ethylhexanal, n-dodecanal, 4,5-dimethylheptanal and n-decanal. The preferred aldehydes are straight-chain aldehydes, that is, are aldehydes wherein all carbon atoms present form a continuous, unbranched carbon-atom chain, and best results are obtained when the aldehyde has from 3 to 5 carbon atoms. Propionaldehyde is a particularly preferred aldehyde reactant.

The process of the invention comprises contacting the aldehyde reactant with ammonia in the vapor phase at an elevated temperature over a metal oxide catalyst, which catalyst comprises essentially oxygen chemically combined with the catalyst components aluminum, phosphorus and at least one, preferably only one, additional Group VIII metal component, which metal is a Group VIII metal having an atomic number from 27 to 28 inclusive, i.e., nickel and/or cobalt. In alternative terms, the catalyst is a three-component oxide catalyst wherein the components are aluminum, phosphorus and a Group VIII metal of atomic number from 27 to 28 inclusive. The chemical nature of suitable catalysts is variable, that is, the components are present at least partially as a mixture of oxides per se, or the components are present in a chemically combined form such as a nickel aluminum phosphate or a cobalt aluminum phosphate. The preferred catalysts, however, consist essentially of a normal metal phosphate material composed of cobalt or nickel and aluminum chemically combined with ortho-phosphate radicals. Although no specific gram-atomic ratio of the Group VIII metal to aluminum is required, in the preferred modification the catalyst contains, on an average, a ratio of atoms of Group VIII metal of atomic number from 27 to 28 to atoms of aluminum of from about 1:10 to about 10:1. When the catalyst is a nickel aluminum phosphate, atomic ratios comparatively high in aluminum are more satisfactory, such as nickel aluminum phosphates wherein the ratio of atoms of nickel to atoms of aluminum is from about 1:1 to about 1:9. Alternatively, when a cobalt aluminum phosphate is employed, best results are obtained through utilization of catalysts wherein the ratio of atoms of cobalt to atoms of aluminum is from about 1:3 to about 9:1, particularly from about 1:2 to about 3:1.

The metal phosphate catalysts are prepared in conventional manner, as by mixing aqueous solutions of cobalt or nickel and aluminum salts, e.g., acetates or nitrates, with ammonium phosphate, and maintaining the resulting mixture at a pH above 7 to promote formation of a cobalt or nickel aluminum phosphate precipitate. The precipitate is washed and dried, and then calcined at temperatures of about 400° C. to 600° C. to decompose the nitrate, acetate or like anions present, and thereby provide the cobalt or nickel aluminum phosphate. Other known methods for preparing such catalysts are also suitable. If desired, the catalyst is supported on a suitable compatible solid carrier although the presence of a catalyst support is not required.

The process of the invention comprises contacting the catalyst with a gaseous mixture of the aldehyde reactant and ammonia in a suitable reactor which is customarily tubular in form. The catalyst is maintained in the reactor in the form of a stationary bed, as a dense suspended system or as a fluidized system and the process is conducted as a batch, semi-continuous or a continuous operation.

The method of mixing the reactants is not critical. The reactants may be mixed prior to or simultaneously with introduction into the reaction zone, although best results are obtained when the aldehyde and ammonia reactants are maintained separately until the time of catalyst contacting. It is also desirable, on occasion, to employ preheating means to promote more extensive vaporization of the aldehyde reactant prior to introduction into the reactor. The molar ratio of aldehyde reactant to ammonia which is most suitably employed is variable, depending in part upon the reactivity of the aldehyde. Molar ratios of aldehyde to ammonia from about 1:10 to about 10:1 are generally satisfactory. From stoichiometric considerations of the reaction, the desirability of a molar amount of the aldehyde at least equal to the molar amount of ammonia is indicated, and molar ratios of aldehyde to ammonia from about 1:1 to about 4:1 are preferred. The aldehyde and ammonia are suitably mixed and introduced to the reactor in the substantial absence of diluent materials; however, it is also on occasion useful to employ inert gaseous diluents as carrier gases, particularly when the aldehyde is high boiling. Exemplary diluent gases to be employed in the latter modification includes nitrogen, argon, helium, steam and the like.

The reaction is conducted at any convenient pressure. Although the process is operable at atmospheric, subatmospheric or superatmospheric pressure, so long as the reactants are maintained in the vapor phase, little advantage is realized by employing pressures substantially different from atmospheric pressure, and the use of a pressure that is substantially atmospheric, e.g., from about 0.5 atmosphere to about 2 atmospheres, is preferred. The reaction is conducted at an elevated temperature, such as a reaction temperature of from about 300° C. to about 500° C., preferably from about 340° C. to about 370° C.

As in the case of most high temperature reactions of organic compounds, it is desirable to control the reaction time, i.e., the average time during which the reactants are in contact with the catalyst, in order to prevent undesirable further reaction. The reaction time is typically controlled by varying the rate at which the reactants are introduced into the reactor, and reaction times from about 0.1 second to about 20 seconds are satisfactory, particularly reaction times of from about 1 second to about 5 seconds. An alternative method of measuring reactant-catalyst contact time is in terms of the gaseous hourly space velocity, commonly termed GHSV, which term measures the volume of gaseous reactants, corrected to standard conditions, which contacts each volume of catalyst per hour and is customarily expressed in units of reciprocal time. In the process of the invention, GHSV values from about 60 hr.$^{-1}$ to about 13,000 hr.$^{-1}$ are satisfactory with the optimum value depending primarily upon the reactivity of the aldehyde. Preferred GHSV values are from about 600 hr.$^{-1}$ to about 3000 hr.$^{-1}$.

Subsequent to reaction, the effluent from the reactor is condensed and the desired alkyl-substituted pyridine product is separated and recovered by conventional means as by fractional distillation, selective extraction, crystallization and the like. Unreacted aldehyde and ammonia are suitably recovered and recycled. During extended periods of operation, the activity of the catalyst decreases somewhat, due to the expected tendency to coke. However, treatment of a deactivated catalyst with air or oxygen, alternatively in the presence or absence of steam, at temperatures of about 400° C. to about 700° C. serves to regenerate catalyst activity.

The products of the invention are pyridines possessing one or more alkyl substituents on the ring carbon atoms thereof, and most frequently pyridine products having three alkyl substituents are encountered. In most cases, the predominant product is a 2,3,5-trialkylpyridine with the length and character of the alkyl substituents depending upon the nature of the aldehyde reactant, and is apparently formed by condensation of three molecules of the aldehyde reactant with one molecule of ammonia. For example, propionaldehyde reacts with ammonia to produce 2-ethyl-3,5-dimethylpyridine. Alternatively, when n-butyraldehyde is employed as the aldehyde reactant, the major product is 2-propyl-3,5-diethylpyridine. It will be apparent that a variety of alkyl-substituted pyridine products are produced by varying the character of the aldehyde reactant and the number of carbon atoms present therein.

The pyridine products are useful in many applications, e.g., as selective extracting agents, organic bases and the like, and are also useful as chemical intermediates in the production of pyridine carboxylic acids, piperidine derivatives and other derivatives prepared from the pyridine product by conventional methods.

To further illustrate the improved process of the invention, the following examples are provided. It should be understood that the details thereof are not to be regarded as limitations, as they may be varied as will be understood by one skilled in this art.

EXAMPLE I

Various cobalt aluminum phosphate catalysts were prepared by slowly adding 2 liters of an aqueous solution containing calculated quantities of cobalt nitrate and aluminum nitrate to 2 liters of an aqueous solution of 264 g. of ammonium phosphate. The resulting mixture was agitated during the addition and the pH of the solution was maintained at a value of 8 by addition of ammonia. The precipitate thus obtained was filtered, washed with 3 liters of water, dried at 115° C. for 2 hours, calcined at 500° C. for 2 hours and then milled and sieved. The portion obtained between 1 mm. and 2 mm. sieves was used in the reactor which was constructed of quartz and had a volume of about 50 ml. The reactor was packed with a layer of about 15 ml. of 1.5 mm. diameter glass beads, followed by a layer of about 20 ml. (approximately 5 g.) of the catalyst and an additional 15 ml. of the glass beads. The reactor was heated to reaction temperature and calculated quantities of ammonia and propionaldehyde introduced at atmospheric pressure. The effluent from the reactor was collected in ice-cooled traps and analyzed by gas-liquid chromatography. In each of the following examples, the conversion of propionaldehyde was essentially quantitative.

A series of experiments was conducted employing the catalysts of the invention and, for comparison, other catalytic materials. The results are shown in Table I wherein the term "selectivity" refers to selectivity to 2-ethyl-3,5-dimethylpyridine.

TABLE I

| Catalyst | Temp., °C. | GHSV, hr.$^{-1}$ | Molar ratio $C_3H_6O/NH_3$ | Selectivity, percent |
|---|---|---|---|---|
| $Co_3Al_2(PO_4)_4$ | 350 | 742 | 2:1 | 65 |
| $Co_3Al_3(PO_4)_5$ | 350 | 742 | 2:1 | 61 |
| $Co_6Al_3(PO_4)_7$ | 350 | 742 | 2:1 | 57 |
| $Co_3Al(PO_4)_3$ | 350 | 1080 | 2:1 | 56 |
| $Co_3Al_3(PO_4)_5$ | 350 | 855 | 2:1 | 55 |
| $Co_3Al_3(PO_4)_5$ | 350 | 694 | 2:1 | 54 |
| $Co_4Al(PO_4)_5$ | 350 | 694 | 2:1 | 51 |
| $NaH_2PO_4/SiO_2$ | 365–375 | 705 | 1:4 | 34 |
| $NaH_2PO_4$ | 375 | 251 | 1:1 | 39 |
| $Al(PO_4)$ | 350 | 2400 | 2:1 | 38 |
| $Al_2O_3$ | 350 | 428 | 2:1 | 35 |
| $Cd_3(PO_4)_2$ | 350 | 694 | 2:1 | 30 |
| $Co_3(PO_4)_2$ | 350 | 694 | 2:1 | 30 |
| $Cr_2O_3 \cdot Al_2O_3$ | 400 | 1070 | 2:1 | 28 |
| $BPO_4$ | 350 | 713 | 2:1 | 26 |

EXAMPLE II

By a procedure similar to that of Example I, propionaldehyde and ammonia were reacted in the presence of nickel aluminum phosphate catalysts. The results of a series of experiments are shown in Table II wherein the term "selectivity" refers to selectivity to 2-ethyl-3,5-dimethylpyridine based on an essentially quantitative conversion of propionaldehyde, and the ratio "Ni:Al" indicates the relative number of atoms of nickel to atoms of aluminum in the nickel aluminum phosphate catalyst employed.

TABLE II

| Ratio Ni:Al | Temp., °C. | GHSV, hr.$^{-1}$ | Molar ratio $C_3H_6O/NH_3$ | Selectivity, percent |
|---|---|---|---|---|
| 1:7 | 350 | 740 | 2:1 | 55 |
| 1:7 | 400 | 1070 | 2:1 | 55 |
| 1:1 | 350 | 690 | 2:1 | 44 |

EXAMPLE III

To determine the effect of temperature in the present process, a series of experiments was conducted employing a 2:1 molar ratio of propionaldehyde to ammonia and various cobalt aluminum phosphate catalysts at a GHSV of 742 hr.$^{-1}$. The results are shown in Table III wherein selectivity refers to selectivity to 2-ethyl-3,5-dimethylpyridine product.

TABLE III

| Temperature, °C. | Selectivity employing | |
|---|---|---|
| | $Co_3Al_3(PO_4)_5$ | $Co_3Al_2(PO_4)_4$ |
| 290 | 44 | |
| 300 | | 42 |
| 310 | 46 | |
| 330 | 51 | |
| 350 | 61 | 65 |
| 370 | 60 | 62 |
| 390 | 58 | |
| 400 | | 56 |
| 410 | 54 | |
| 430 | 46 | |
| 450 | 39 | |
| 470 | 27 | |

EXAMPLE IV

For purposes of further comparison, propionaldehyde and ammonia in a molar ratio of 1:1 were contacted for 6 hours with 12 g. of ammonium fluoride as catalyst in the liquid phase in 300 g. of water in an autoclave at autogenous pressure (about 30 atm.) and a temperature of 200° C. The yield of 2-ethyl-3,5-dimethylpyridine thus obtained was 26% based on a complete conversion of the propionaldehyde.

EXAMPLE V

By the procedure of Example I, 3-methylbutanal and ammonia in a molar ratio of 2:1 were passed over

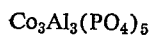

$Co_3Al_3(PO_4)_5$ catalyst at 350° C. and a GHSV of 165 hr.$^{-1}$. The selectivity to 2-isobutyl-3,5-diisopropylpyridine was 53% based on a complete conversion of aldehyde. In like manner, substitution of n-butanal as the aldehyde resulting in a 74% selectivity to 2-propyl-3,5-diethylpyridine. When isobutyraldehyde was employed, however, no pyridine product was observed.

We claim as our invention:

1. The process of producing alkyl-substituted pyridine by contacting acyclic, hydrocarbon mono-alkanal of from 3 to 12 carbon atoms and two hydrogen substituents on the carbon atom alpha to the carbonyl moiety, with ammonia, in the vapor phase at a temperature of from about 300° C. to about 500° C., in the presence of a Group VIII metal aluminum phosphate catalyst wherein the Group VIII metal is Group VIII metal of atomic number from 27 to 28 inclusive.

2. The process of producing alkyl-substituted pyridine by contacting acyclic hydrocarbon mono-alkanal of from 3 to 12 carbon atoms and 2 hydrogen substituents on the carbon atom alpha to the carbonyl moiety, with ammonia, in the vapor phase at a temperature of from about 300° C. to about 500° C. for a reaction time of from about 0.1 second to about 20 seconds in the presence of a Group VIII metal aluminum phosphate catalyst wherein the group VIII metal is Group VIII metal of atomic number from 27 to 28 inclusive.

3. The process of claim 2 wherein the alkanal is alkanal of from 3 to 5 carbon atoms.

4. The process of producing alkyl-substituted pyridine by contacting acyclic hydrocarbon mono-alkanal of from 3 to 12 carbon atoms and 2 hydrogen substituents on the carbon atom alpha to the carbonyl moiety, with from about 0.1 mole to about 10 moles of ammonia per mole of alkanal, in the vapor phase at a temperature of from about 300° C. to about 500° C. for a reaction time of from about 0.1 second to about 20 seconds in the presence of a cobalt aluminum ortho-phosphate catalyst wherein the ratio of atoms of cobalt to atoms of aluminum is from about 1:10 to about 10:1.

5. The process of claim 4 wherein the molar ratio of alkanal to ammonia is from about 1:1 to about 4:1.

6. The process of claim 4 wherein the alkanal is propionaldehyde.

7. The process of claim 4 wherein the alkanal is butyraldehyde.

8. The process of producing alkyl-substituted pyridine by contacting acyclic hydrocarbon mono-alkanal of from 3 to 12 carbon atoms and 2 hydrogen substituents on the carbon atom alpha to the carbonyl moiety, with from about 0.1 mole to about 10 moles of ammonia per mole of alkanal, in the vapor phase at a temperature of from about 300° C. to about 500° C. for a reaction time of from about 0.1 second to about 20 seconds in the presence of a nickel aluminum ortho-phosphate catalyst wherein the ratio of atoms of nickel to atoms of aluminum is from about 1:10 to about 10:1.

9. The process of claim 8 wherein the molar ratio of alkanal to ammonia is from about 1:1 to about 4:1.

10. The process of claim 8 wherein the aldehyde is propionaldehyde.

11. The process of claim 8 wherein the ratio of atoms of nickel to atoms of aluminum is from about 1:1 to about 1:9.

References Cited

UNITED STATES PATENTS 2,877,228   3/1959   Mahan _____ 260—290

HENRY R. JILES, Primary Examiner.

C. M. SHURKO, Assistant Examiner.

U.S. Cl. X.R.

252—466